(12) United States Patent
Yamasaki (10) Patent No.: US 10,994,370 B2
(45) Date of Patent: May 4, 2021

(54) LAMINATION CONTROL DEVICE, AND LAMINATION CONTROL METHOD AND PROGRAM

(71) Applicant: KOBE STEEL, LTD., Hyogo (JP)

(72) Inventor: Takemasa Yamasaki, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 57 days.

(21) Appl. No.: 16/473,295

(22) PCT Filed: Feb. 6, 2018

(86) PCT No.: PCT/JP2018/004101
§ 371 (c)(1),
(2) Date: Jun. 25, 2019

(87) PCT Pub. No.: WO2018/147296
PCT Pub. Date: Aug. 16, 2018

(65) Prior Publication Data
US 2019/0389004 A1 Dec. 26, 2019

(30) Foreign Application Priority Data

Feb. 8, 2017 (JP) .............................. JP2017-021093

(51) Int. Cl.
*B23K 26/342* (2014.01)
*B33Y 50/00* (2015.01)
(Continued)

(52) U.S. Cl.
CPC ........ *B23K 26/342* (2015.10); *B23K 26/0884* (2013.01); *B33Y 50/00* (2014.12);
(Continued)

(58) Field of Classification Search
CPC .............. B23K 26/342; B23K 26/0884; G05B 19/4097; G05B 19/49011
See application file for complete search history.

(56) References Cited

U.S. PATENT DOCUMENTS

| RE35,756 E | * | 3/1998 | Schneebeli | ............... F03B 1/02 |
| | | | | 219/76.14 |
| 6,129,872 A | * | 10/2000 | Jang | ........................ B29C 48/17 |
| | | | | 264/75 |

(Continued)

FOREIGN PATENT DOCUMENTS

| JP | 2003-266174 A | 9/2003 |
| JP | 3784539 B2 | 6/2006 |

(Continued)

OTHER PUBLICATIONS

"Minimizing Staircase Errors in the Orthogonal Layered Manufacturing System" Yong Yang et al. ; IEEE vol. 2 No. Jul. 3, 2005.*

(Continued)

*Primary Examiner* — Vincent H Tran
(74) *Attorney, Agent, or Firm* — Studebaker & Brackett PC (57) ABSTRACT

In a track determination device, a CAD data acquisition unit acquires shape data that represents a shape of a three-dimensional formed object. A deposition direction setting unit generates control information for controlling a lamination device that laminates the molten metal in order to form a formed object, based on the shape data acquired by the CAD data acquisition unit. The control information is information indicating at least a specific deposition direction of the molten metal such that an error between a first deposition position set in advance and a second deposition position in accordance with an actual laminated state is reduced. A control program output unit outputs the control information generated by the deposition direction setting unit.

7 Claims, 10 Drawing Sheets

(51) Int. Cl.
  *B23K 26/08*  (2014.01)
  *G05B 19/4097*  (2006.01)
(52) U.S. Cl.
  CPC .......... *G05B 19/4097* (2013.01); *G05B 2219/49007* (2013.01); *G05B 2219/49011* (2013.01)

(56) References Cited

U.S. PATENT DOCUMENTS

| | | | | |
|---|---|---|---|---|
| 2005/0288813 | A1* | 12/2005 | Yang | B22F 3/1055 |
| | | | | 700/119 |
| 2015/0004046 | A1 | 1/2015 | Graham et al. | |
| 2017/0232518 | A1* | 8/2017 | Shi | B23K 26/0884 |
| | | | | 419/7 |
| 2017/0252806 | A1* | 9/2017 | Wienberg | B23K 26/342 |
| 2018/0072000 | A1* | 3/2018 | Riemann | B33Y 10/00 |
| 2019/0210153 | A1* | 7/2019 | Hamers | B23K 26/032 |

FOREIGN PATENT DOCUMENTS

| | | |
|---|---|---|
| JP | 2007-275945 A | 10/2007 |
| JP | 2015-160217 A | 9/2015 |
| JP | 2016-196012 A | 11/2016 |

OTHER PUBLICATIONS

International Search Report issued in PCT/JP2018/004101; dated Mar. 27, 2018.

Written Opinion issued in PCT/JP2018/004101; dated Mar. 27, 2018.

The extended European search report issued by the European Patent Office dated Nov. 13, 2020, which corresponds to European Patent Application No. 18751883.2-1016 and is related to U.S. Appl. No. 16/473,295.

* cited by examiner

LAMINATION CONTROL DEVICE, AND LAMINATION CONTROL METHOD AND PROGRAM

TECHNICAL FIELD

The present invention relates to a lamination control device, a lamination control method, and a program.

BACKGROUND ART

In recent years, needs as means for producing 3D printers have been increasing, and in particular, application to metal materials has been researched and developed for practical use in the aircraft industry and the like. In the 3D printer using a metal material, a metal powder or a metal wire is melted using a heat source, such as a laser or an arc, and molten metals are laminated to form a formed object.

Techniques for laminating molten metals to form a formed object in this manner have been known from the related art (for example, refer to Patent Documents 1 and 2).

In Patent Document 1, a method for manufacturing a mold is disclosed which includes: a step of generating shape data that represents a shape of a mold; a step of dividing the mold into a laminated body along contour lines based on the generated shape data; and a step of creating a movement path of a welding torch for supplying a filler material based on the shape data of the obtained laminated body, has been described.

In Patent Document 2, a method for manufacturing a three-dimensional object using a welding bead is disclosed which includes: a torch scanning step of scanning an overlaying torch along an inclined surface inclined at a constant angle from a vertical surface or a horizontal surface; and a torch shift step of moving the overlaying torch in a direction orthogonal to a scanning direction to perform the next scanning, in which the torch scanning step and the torch shift step are alternately repeated.

CITATION LIST

Patent Document

Patent Document 1: Japanese Patent No. 3784539
Patent Document 2: JP-A-2003-266174

SUMMARY OF THE INVENTION

Problems that the Invention is to Solve

In general, when laminating the molten metals to form a formed object, a deposition position of the molten metal is set in advance. However, when the molten metals are actually laminated, there is a case where an error occurs between a deposition position set in accordance with the laminated state and the deposition position set in advance. In this case, the deposition position set in advance is corrected to the welding deposition set in accordance with the actual laminated state.

An object of the present invention is to reduce a correction amount when correcting a deposition position of the molten metal set in advance to a deposition position of the molten metal set in accordance with the actual laminated state.

Means for Solving the Problems

According to the present invention, there is provided a lamination control device including: an acquisition unit configured to acquire shape data that represents a shape of a three-dimensional formed object; a generation unit configured to generate control information which is information for controlling a lamination device that laminates a molten metal for forming the formed object, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the shape data acquired by the acquisition unit; and an output unit configured to output the control information generated by the generation unit.

Here, the specific deposition direction of the molten metal may be a direction such that the error between the first deposition position and the second deposition position is minimized.

In addition, each layer of the molten metal may be approximated by a figure including a hemisphere, and the specific deposition direction of the molten metal may be a direction of a normal line that passes through the first deposition position of the hemisphere.

Furthermore, the generation unit may generate the control information which is information for further controlling a posture of the lamination device such that the error between the first deposition position and the second deposition position is reduced compared to a case where the deposition direction of the molten metal is oriented vertically downward so as to laminate the molten metals from the specific deposition direction of the molten metal.

In addition, the generation unit may generate the control information which is information for further controlling a posture of a support device that supports the formed object such that the error between the first deposition position and the second deposition position is reduced compared to a case where the deposition direction of the molten metal is oriented vertically downward so as to laminate the molten metals from the specific deposition direction of the molten metal.

Further, according to the present invention, there is provided a lamination control method including: a step of acquiring shape data that represents a shape of a three-dimensional formed object; a step of generating control information which is information for controlling a lamination device that laminates a molten metal for forming the formed object, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the acquired shape data; and a step of outputting the generated control information.

Furthermore, according to the present invention, there is provided a program that causes a computer to realize: a function of acquiring shape data that represents a shape of a three-dimensional formed object; a function of generating control information which is information for controlling a lamination device that laminates a molten metal for forming the formed object, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the acquired shape data; and a function of outputting the generated control information.

Advantages of the Invention

According to the present invention, a correction amount when correcting the deposition position of the molten metal set in advance to the deposition position of the molten metal set in accordance with the actual laminated state is reduced.

MODES FOR CARRYING OUT THE INVENTION

Figure 1:
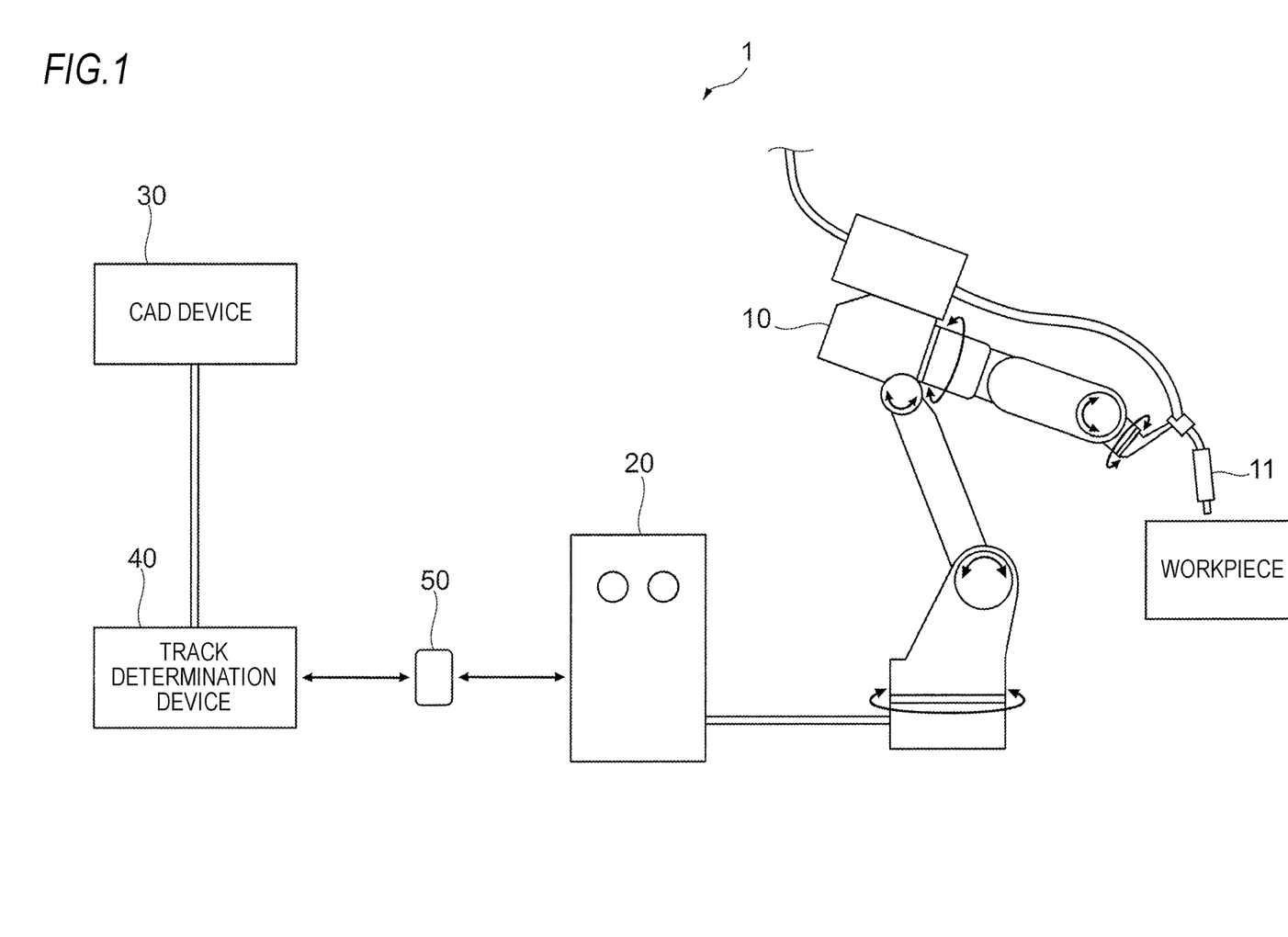
FIG. 1 is a schematic configuration view of a metal lamination forming system according to an embodiment of the present invention.

Hereinafter, an embodiment of the present invention will be described in detail with reference to the attached drawings.
[Configuration of Metal Lamination Forming System]
FIG. 1 is a schematic configuration view of a metal lamination forming system 1 according to the present embodiment.

As illustrated in the drawing, the metal lamination forming system 1 includes a welding robot (manipulator) 10, a control panel 20, a CAD device 30, and a track determination device 40. Further, the track determination device 40 can write a control program for controlling the welding robot 10 into a removable recording medium 50, such as a memory card, and the control panel 20 can read out the control program written into the recording medium 50.

The welding robot 10 includes an arm having a plurality of joints, and performs various operations under the control of the control panel 20. Further, the welding robot 10 has a welding torch 11 for performing work of welding a workpiece at a distal end of the arm. In a case of the metal lamination forming system 1, the welding robot 10 forms a formed object by laminating molten metals with the welding torch 11. In other words, the welding torch 11 is an example of a lamination device for laminating the molten metals to form the formed object. In the present embodiment, an arc is used as a heat source for melting the metal, but a laser or plasma may be used.

The control panel 20 is provided being separated from the welding robot 10 and controls an operation of the welding robot 10. At this time, by operating the control program, the control panel 20 controls the position and posture of the welding torch 11, the deposition amount at the time of welding by the welding torch 11, a travel speed, and the like.

The CAD device 30 is a device for designing the formed object using a computer, and holds the CAD data that represents the shape of a three-dimensional formed object in three-dimensional coordinates.

The track determination device 40 is a device that determines the track of the welding torch 11 based on the CAD data that represents the shape of the formed object, and outputs a control program including the track data that represents the determined track to the recording medium 50. In the present embodiment, the track determination device 40 is provided as an example of the lamination control device.

Overview of Present Embodiment

Figure 2:
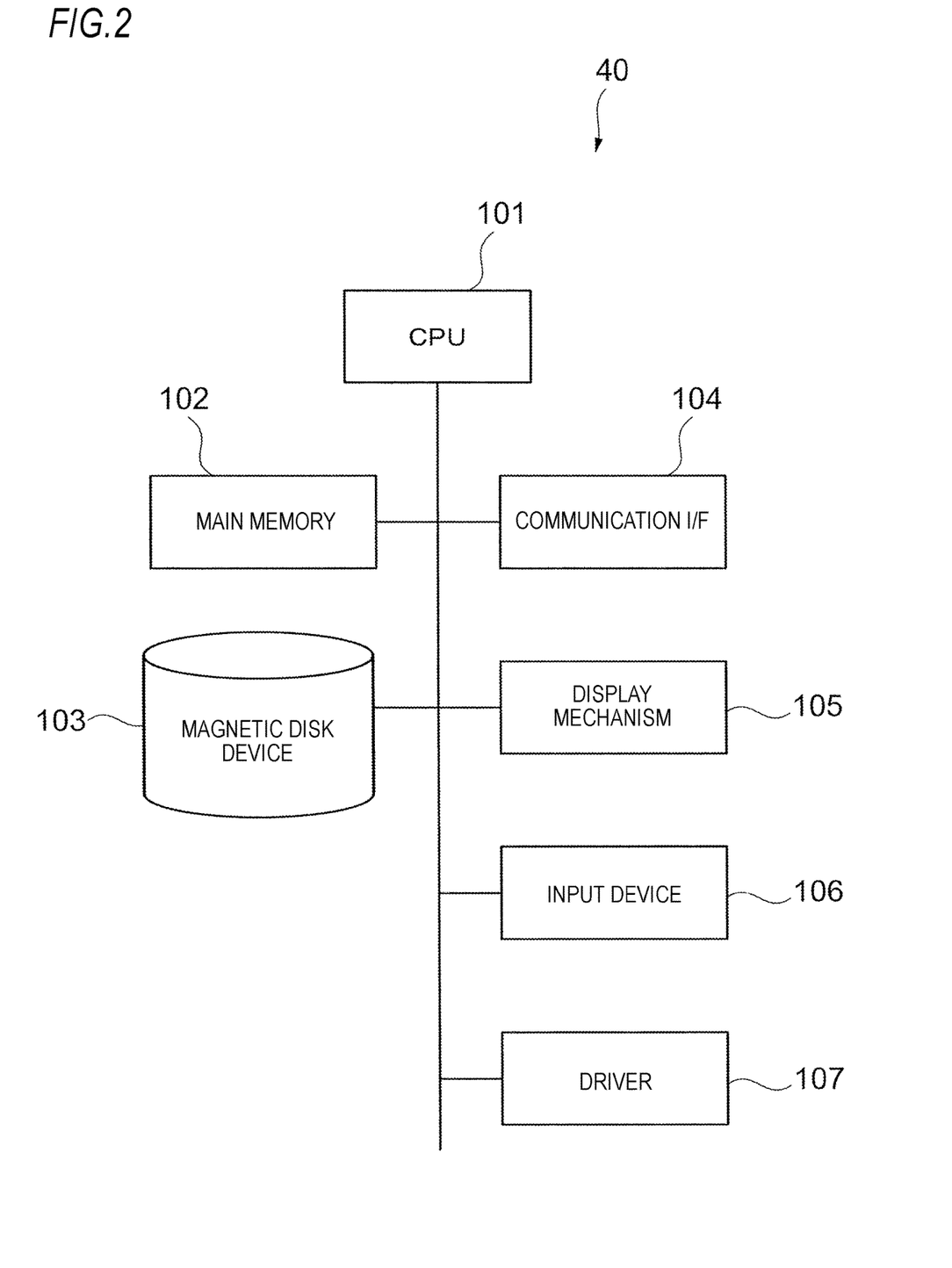
FIG. 2 is a block diagram illustrating a hardware configuration example of a track determination device according to the embodiment of the present invention.

In the present embodiment, for example, when the obliquely-inclined formed object is formed in the metal lamination forming system 1 having such a configuration, generation of an error between a deposition position of the molten metal planned in advance and a deposition position of the molten metal set in accordance with a state of the molten metal already laminated. For this, in particular, the track determination device 40 of the metal lamination forming system 1 performs characteristic processing, and thus, the track determination device 40 will be described in detail below.
[Hardware Configuration of Track Determination Device]
FIG. 2 is a block diagram illustrating a hardware configuration example of the track determination device 40.

As illustrated in the drawing, the track determination device 40 is realized by, for example, a general-purpose personal computer (PC), and includes a CPU 101 as a calculation unit, a main memory 102 as a storage unit, and a magnetic disk device (HDD: hard disk drive) 103. Here, the CPU 101 executes various programs, such as an operating system (OS) or application software, and realizes each function of the track determination device 40. In addition, the main memory 102 is a storage region for storing various programs, data used for the execution thereof, and the like, and the HDD 103 is a storage region for storing input data for the various programs, output data from the various programs, and the like.

In addition, the track determination device 40 includes: a communication I/F 104 for communicating with the outside; a display mechanism 105 including a video memory or a display; an input device 106, such as a keyboard or a mouse; and a driver 107 for reading and writing data out and into a storage medium. FIG. 2 merely exemplifies the hardware configuration in a case where the track determination device 40 is realized by a computer system, and the track determination device 40 is not limited to the illustrated configuration.

[Functional Configuration of Track Determination Device]

Figure 3:
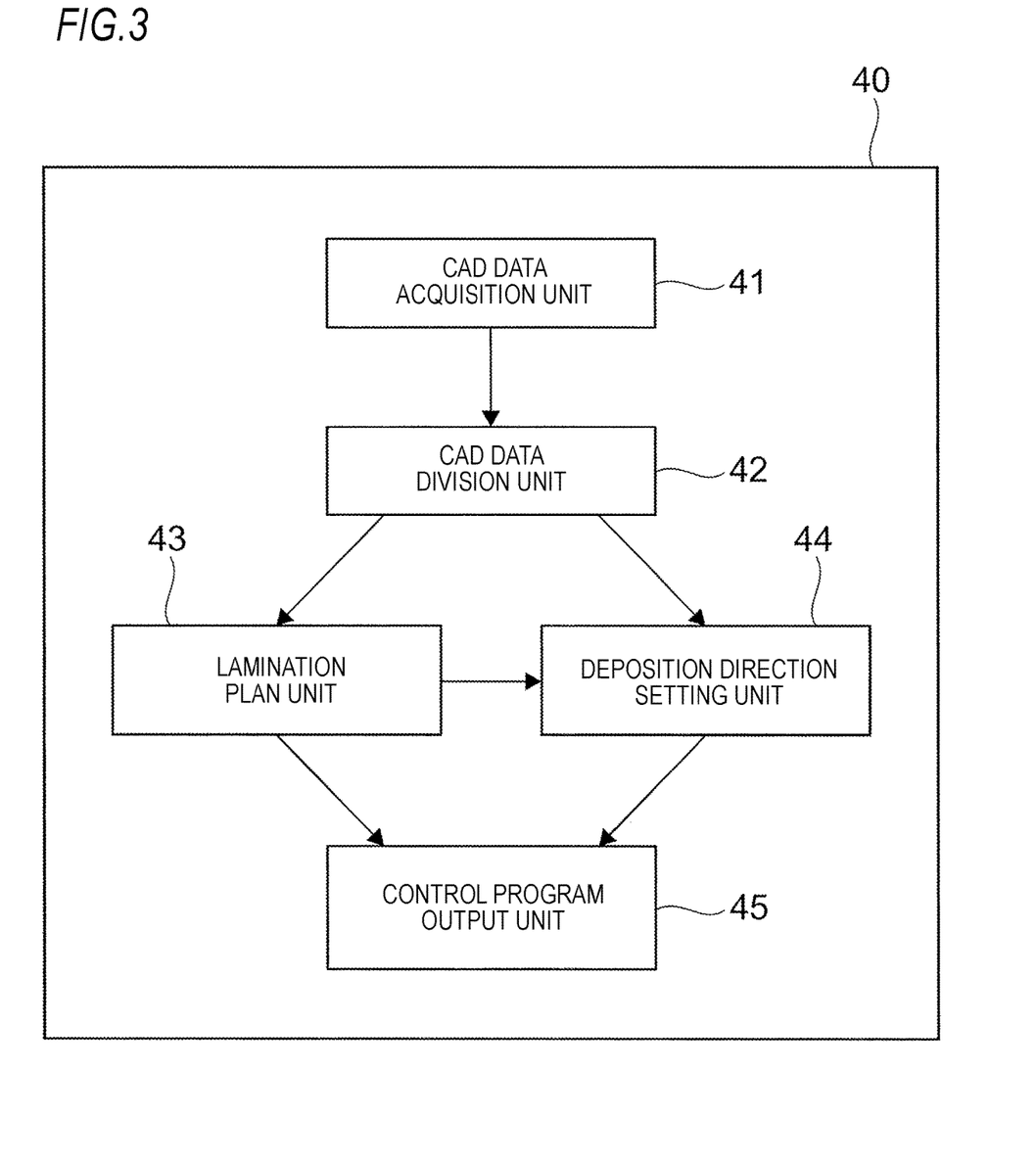
FIG. 3 is a functional block diagram illustrating a functional configuration example of the track determination device according to the embodiment of the present invention.

FIG. 3 is a functional block diagram illustrating a functional configuration example of the track determination device 40 according to the present embodiment. As illustrated in the drawing, the track determination device 40 includes a CAD data acquisition unit 41, a CAD data division unit 42, a lamination plan unit 43, a deposition direction setting unit 44, and a control program output unit 45.

The CAD data acquisition unit 41 acquires the CAD data from the CAD device 30. In the present embodiment, the CAD data is used as an example of shape data that represents the shape of the formed object, and the CAD data acquisition unit 41 is provided as an example of an acquisition unit for acquiring the shape data.

The CAD data division unit 42 divides the CAD data acquired by the CAD data acquisition unit 41 into a plurality of layers.

The lamination plan unit 43 sets welding conditions when depositing the bead and a target position (here, referred to as "deposition position") of the welding torch 11 when depositing the bead, for each layer, based on the CAD data of each layer after the division by the CAD data division unit 42. In the present embodiment, the deposition position set by the lamination plan unit 43 is used as an example of a first deposition position which is a deposition position of the molten metal set in advance.

The deposition direction setting unit 44 sets the deposition direction of the molten metal such that the error between the deposition position planned by the lamination plan unit 43 and the deposition position set in accordance with a state of the molten metals already laminated is reduced, for each layer, based on the CAD data of each layer after the division by the CAD data division unit 42. In the present embodiment, the deposition position set in accordance with the state of the molten metal already laminated is used as an example of a second deposition position which is a deposition position of the molten metal set in accordance with an actual laminated state. In addition, as information for controlling the lamination device, as an example of control information that is information indicating at least a specific deposition direction of the molten metal such that the difference between the first deposition position and the second deposition position is reduced compared to a case where the deposition direction of the molten metal is vertically downward, information of deposition direction set by the deposition direction setting unit 44 is used. In addition, a deposition direction setting unit 44 is provided as an example of a generation unit for generating the control information.

The control program output unit 45 outputs a control program including the welding conditions and the deposition position set by the lamination plan unit 43 and the deposition direction set by the deposition direction setting unit 44 to the recording medium 50. In the present embodiment, the control program output unit 45 is provided as an example of an output unit that outputs the control information.

[Operation of Track Determination Device]
(Overview)

Figure 4:
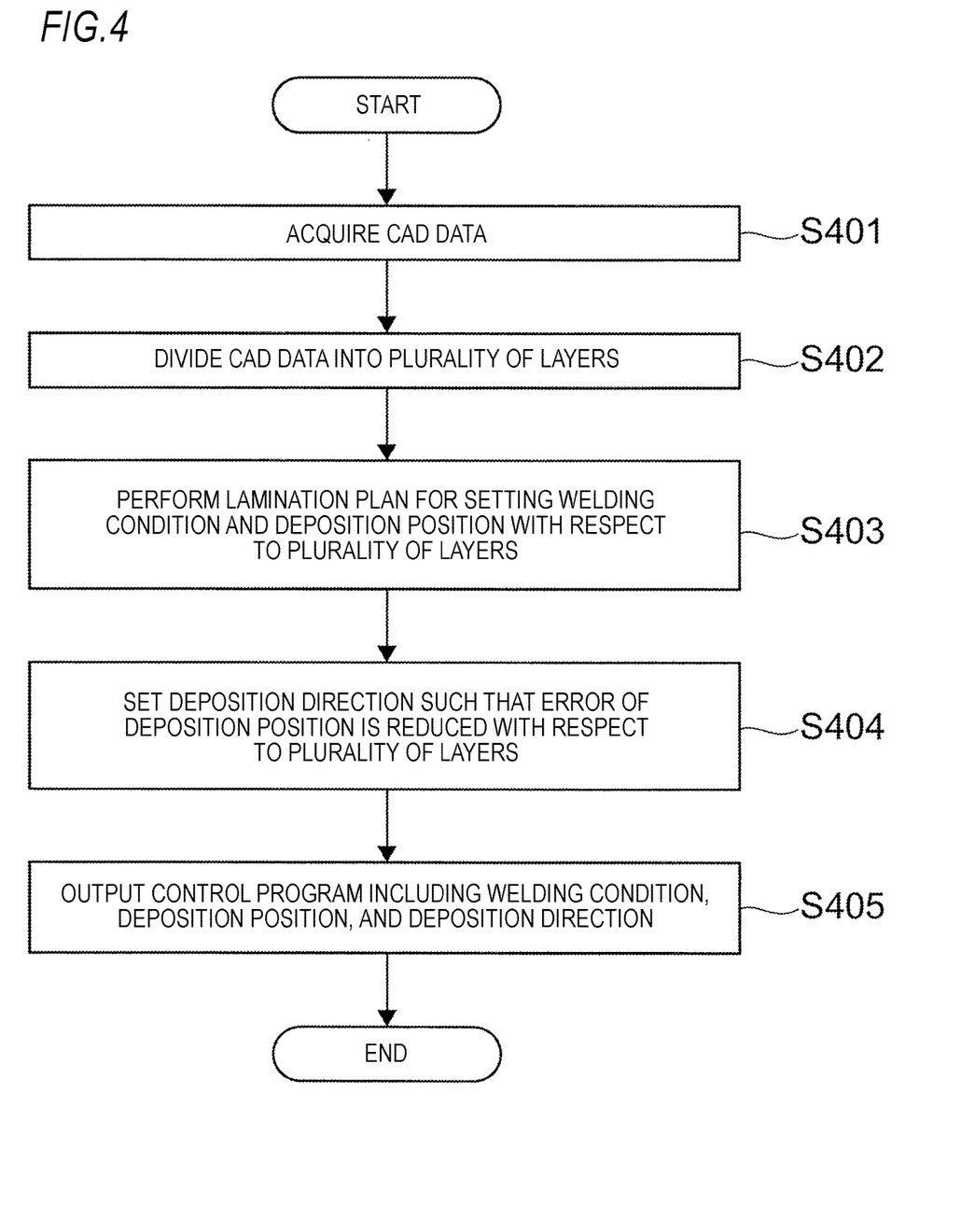
FIG. 4 is a flowchart illustrating an operation example of the track determination device according to the embodiment of the present invention.

FIG. 4 is a flowchart illustrating an operation example of the track determination device 40 according to the present embodiment.

When the operation of the track determination device 40 starts, first, the CAD data acquisition unit 41 acquires the CAD data from the CAD device 30 (step 401).

In addition, the CAD data division unit 42 divides the CAD data acquired in step 401 into a plurality of layers (step 402).

Next, the lamination plan unit 43 performs a lamination planning for setting the welding conditions that are the conditions when depositing the bead and the deposition position which is a target position when depositing the bead, for the plurality of layers obtained in step 402 (step 403).

Next, the deposition direction setting unit 44 sets the deposition direction such that the error between the planned deposition position and the deposition position in accordance with the state of the molten metal already laminated is reduced, for the plurality of layers obtained in step 402 (step 404).

Finally, the control program output unit 45 outputs the control program including the welding conditions and the deposition position set in step 403 and the deposition direction set in step 404 to the recording medium 50 (step 405).

Hereinafter, the processing in each step will be described in detail.

(Details of Step 401)

In step 401, the CAD data acquisition unit 41 acquires the CAD data of the workpiece.

Figure 5A:
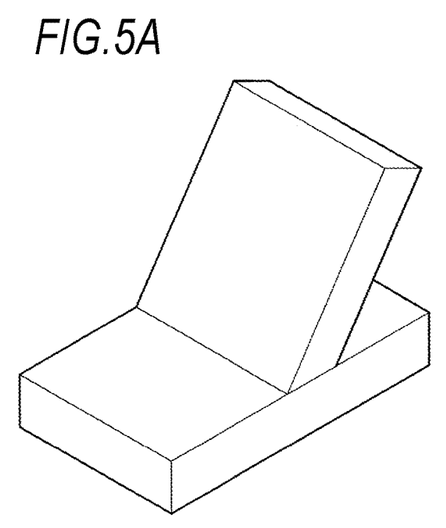
FIGS. 5A to 5D are explanatory views illustrating an example of a workpiece that corresponds to CAD data.
Figure 5B:
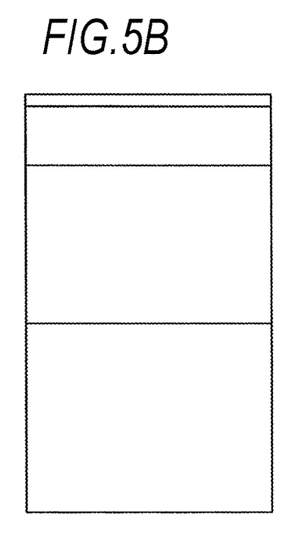
Figure 5C:
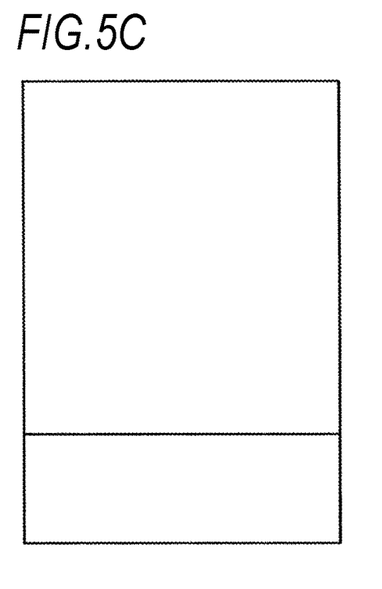
Figure 5D:
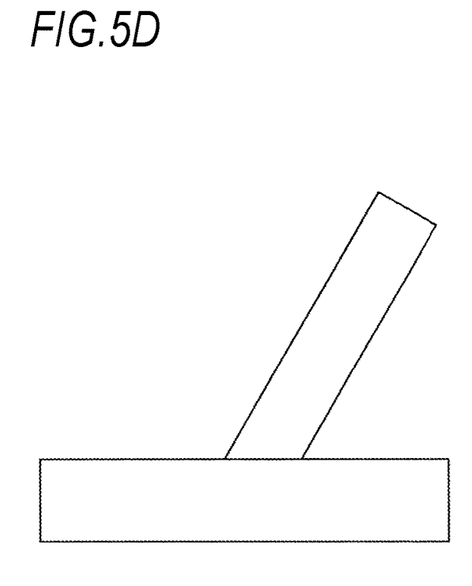

FIGS. 5A to 5D illustrate an example of such a workpiece. FIG. 5A illustrates a perspective view, FIG. 5B illustrates a plan view, FIG. 5C illustrates a front view, and FIG. 5D illustrates a side view, respectively. As illustrated in the drawing, here, as the workpiece, a diagonally inclined wall is used as an example. In addition, the CAD data of the workpiece may be any CAD data as long as the CAD data conforms to the format of the CAD data used in the CAD device 30.

(Details of Step 402)

Figure 6:
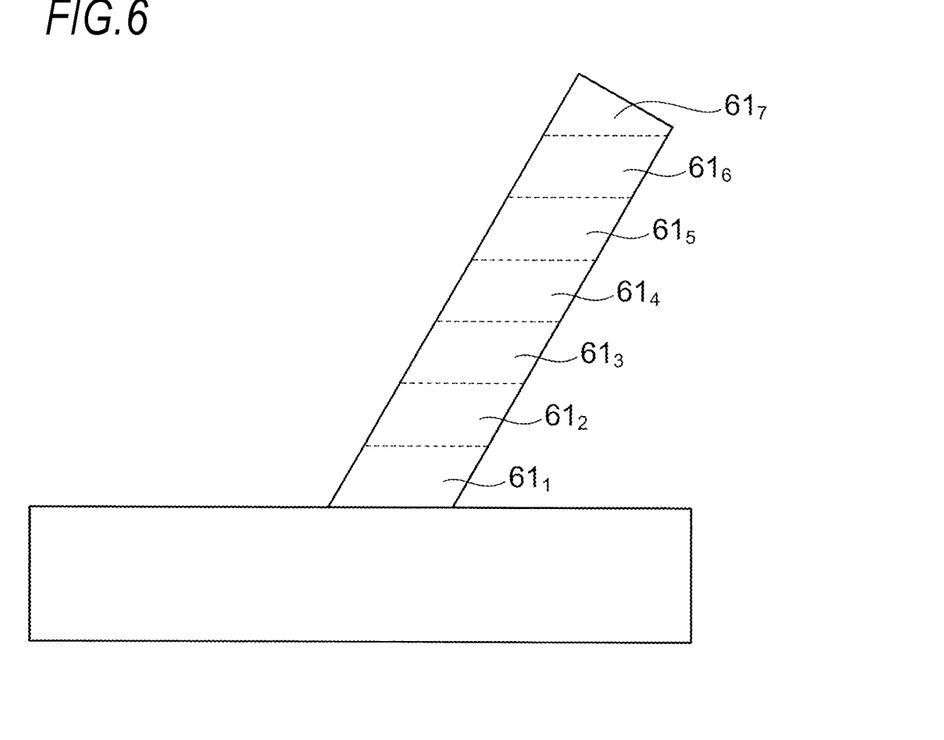
FIG. 6 is an explanatory view illustrating an example of a state where the CAD data is divided on the workpiece.

In step 402, the CAD data division unit 42 divides the CAD data into the plurality of layers. FIG. 6 is an explanatory view illustrating a state where the CAD data is divided on the workpiece illustrated in FIG. 5D. In the drawing, parts $61_1$ to $61_7$ sandwiched by upper and lower adjacent broken lines illustrate the plurality of layers formed by dividing the CAD data.

(Details of Step 403)

In step 403, for each of the plurality of layers obtained by dividing the CAD data, the lamination plan unit 43 sets the welding condition which is a condition when depositing the bead that matches the height and width of the layer, and the deposition position which is a target position when depositing the bead that matches the height and width of the layer.

First, setting of the welding conditions will be described. The lamination plan unit 43 sets the welding conditions that correspond to the height and width of the bead including each layer obtained by dividing the CAD data.

Figure 7:
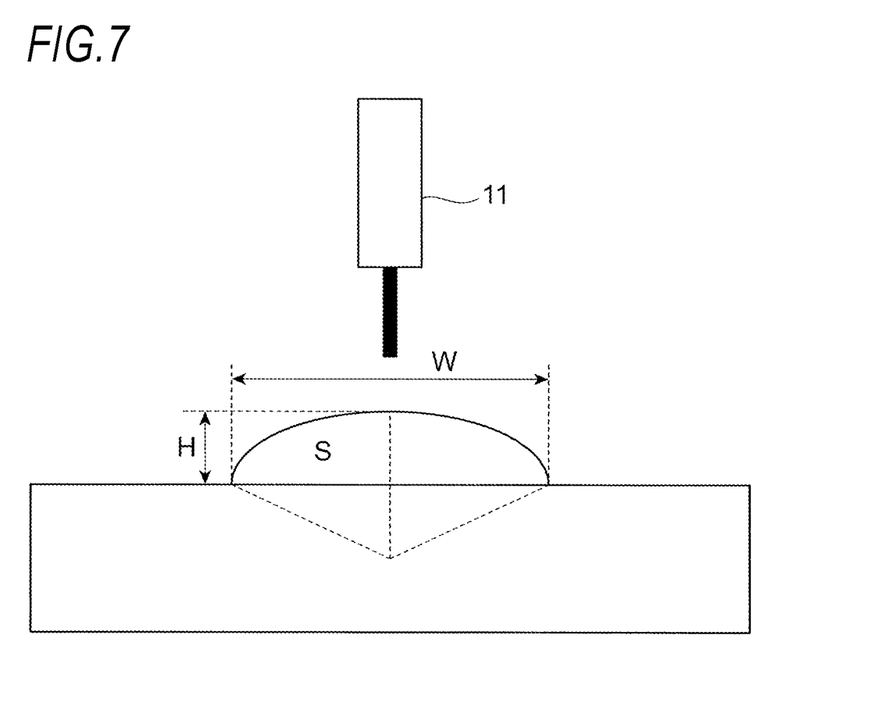
FIG. 7 is an explanatory view illustrating variables used when setting welding conditions.

FIG. 7 is an explanatory view illustrating variables used when setting the welding conditions. In the drawing, the height of the bead is H, the width of the bead is W, and the sectional area of the bead is S. In order to set the welding conditions, first, while changing a sectional area S of the bead by changing a welding speed v and a wire feeding speed $v_{fe}$ by several conditions, bead-on-plate welding and lamination of several layers in the vertical direction are performed, and a height H and a width W per one layer are measured under each condition. Otherwise, the sectional area S of the beads per one layer may be measured under each condition, and the height H and the width W per one layer may be estimated from the sectional area S by calculation. In addition, for example, the height H, the width W, the welding speed v, and the wire feeding speed $v_{fe}$ are associated with each other to create a database. After this, from the data of each layer obtained by dividing the CAD data, the height or the width of the bead including each layer are obtained as the desired height or width, and the welding speed v and the wire feeding speed $v_f$ which satisfy the desired height and width are selected.

First, setting of the deposition position will be described. The lamination plan unit 43 sequentially calculates an estimated shape (hereinafter, referred to as "estimated shape") of the bead including each layer obtained by dividing the CAD data, and sets the deposition position.

Figure 8:
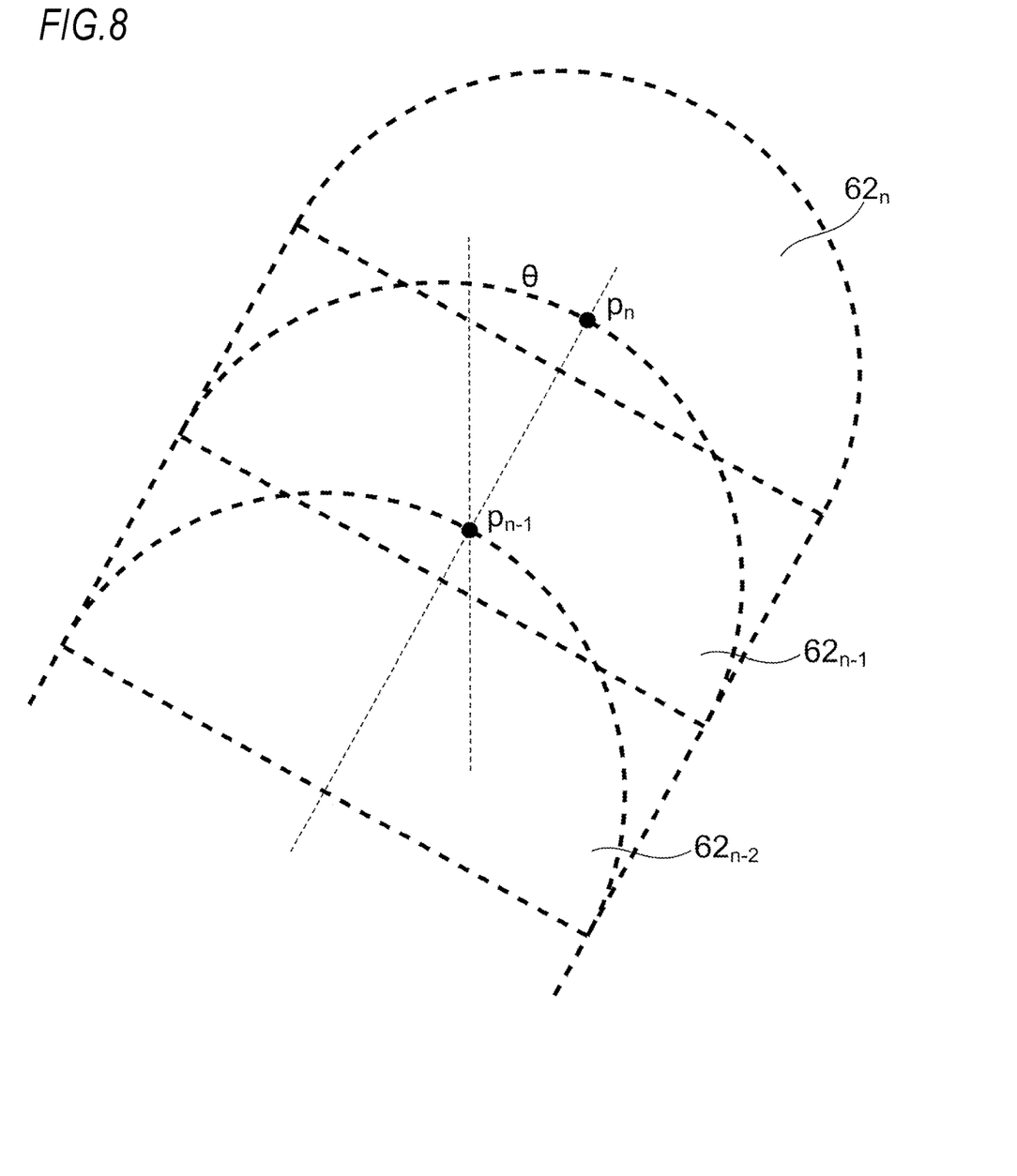
FIG. 8 is an explanatory view illustrating how to obtain a deposition position in a case where lamination is performed with the same deposition amount on each layer.

FIG. 8 is an explanatory view illustrating how to obtain the deposition position in a case where the lamination is performed with the same deposition amount for each layer. Here, sections of each layer are approximated by a square and a semicircle of the same size. In addition, in the drawing, an estimated shape $62_{n-2}$ of the (n−2)-th layer, an estimated shape $62_{n-1}$ of the (n−1)-th layer, and an estimated shape $62_n$ of the n-th layer are illustrated. When obtaining the deposition position, first, the center of the semicircle on the (n−2)-th layer is obtained from the deposition position $p_{n-1}$ of the (n−1)-th layer, a lamination direction angle θ, and the semicircle information. In addition, by calculating an intersection point of the lamination direction and the semicircle on the (n−1)-th layer from the center of the semicircle, the lamination direction angle θ, and the information of the square and the semicircle, a deposition position $P_n$ of the n-th layer is obtained. Here, the lamination direction angle θ is an angle common to all the layers obtained from the CAD data, the present invention is not limited thereto. The angle may be different for each layer obtained from the estimated shape of each layer. Further, the calculation method regarding the section of each layer may be changed depending on a material of the wire or a state of the shape of the parts already laminated.

Figure 9:
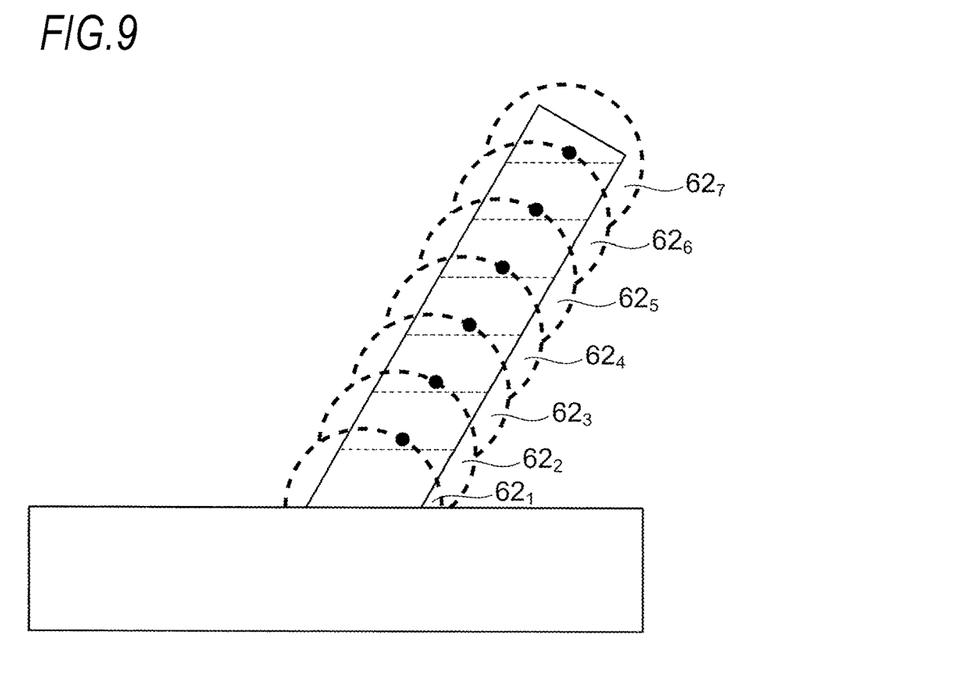
FIG. 9 is an explanatory view illustrating a result of a lamination plan according to the embodiment of the present invention.

FIG. 9 is an explanatory view illustrating the result of the lamination plan in this step. By sequentially performing the above-described calculation, estimated shapes $62_1$ to $62_7$ of the bead including each layer of the workpiece are obtained. In addition, the deposition position of each layer indicated by a black circle is also determined by gradually obtaining the intersection point of the lamination direction and the estimated shapes $62_1$ to $62_7$ of each layer from the first layer. (Details of Step 404)

In step 404, the deposition direction setting unit 44 sets the deposition direction of the molten metal such that the error between the deposition position and the deposition position set in accordance with the shape (hereinafter, referred to as "laminated shape") of the bead already laminated is reduced, for each of the plurality of layers obtained by dividing the CAD data. Here, as the deposition direction of the molten metal, an angle (hereinafter, referred to as "torch angle") of the welding torch 11 is used as an example. In other words, the deposition direction setting unit 44 sets the torch angle to an angle of a direction (preferably, minimum) such that the error between the planned deposition position and the deposition position set in accordance with the laminated shape is reduced in a case where the amount of molten metal in the laminated shape is large or small.

Figure 10:
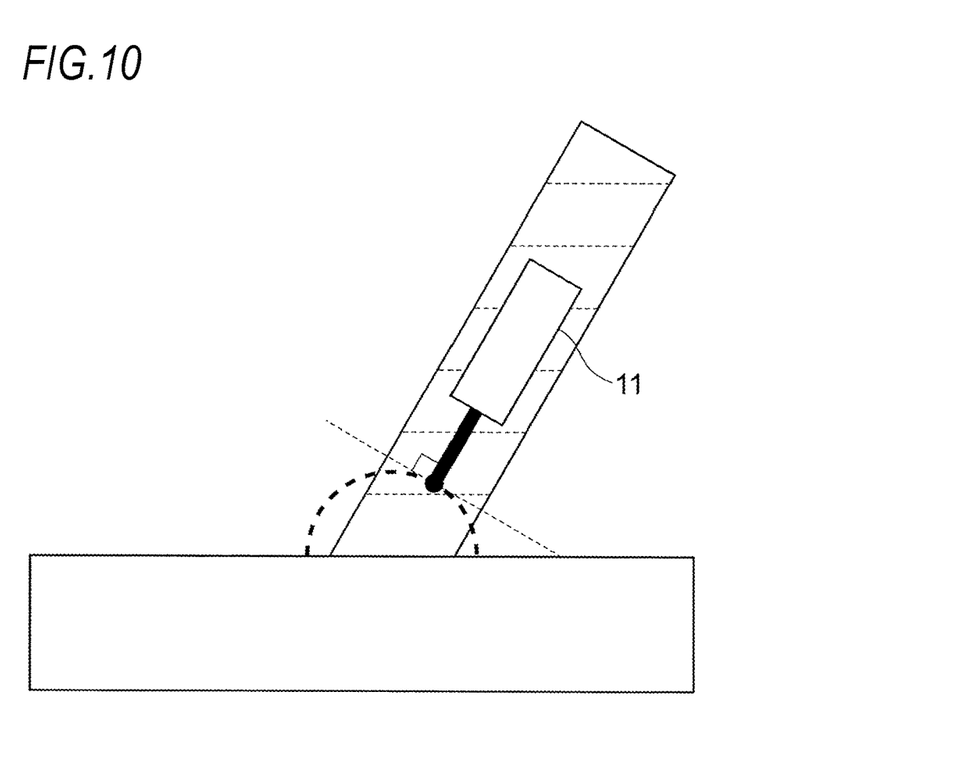
FIG. 10 is an explanatory view describing a setting method of a torch angle according to the embodiment of the present invention.

FIG. 10 is an explanatory view illustrating a setting method of the torch angle. Here, the torch angle is set to match the lamination direction, that is, to match the angle in a normal direction at the deposition position of a hemisphere which is the estimated shape of the bead.

FIGS. 11A to 11E are explanatory views illustrating reduction of the error by setting the torch angle similar to FIG. 10. In the drawings, a solid line indicates a laminated shape and a broken line indicates an estimated shape.

Figure 11A:
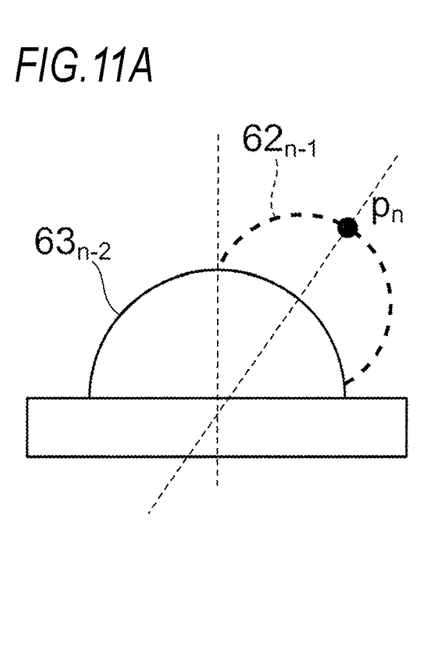
FIGS. 11A to 11E are explanatory views illustrating an example of reduction of an error by setting the torch angle.

First, FIG. 11A illustrates a state where a laminated shape $63_{n-2}$ is formed on the (n−2)-th layer, an estimated shape $62_{n-1}$ is planned on the (n−1)-th layer, and the deposition position $p_n$ of the n-th layer is further planned.

Figure 11B:
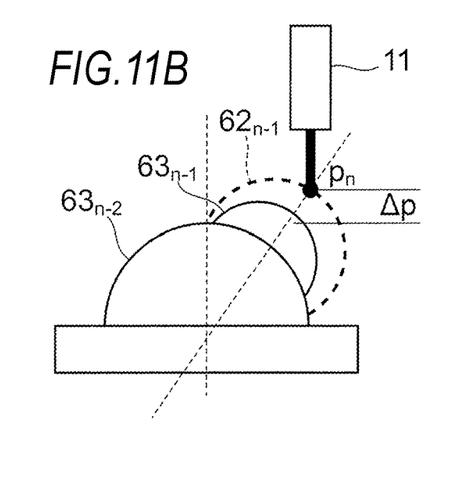
Figure 11C:
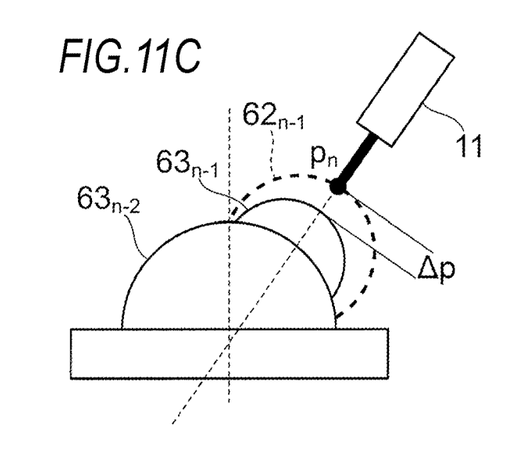

In this state, as illustrated in FIGS. 11B and 11C, the amount of molten metal in the laminated shape $63_{n-1}$ of the (n−1)-th layer is smaller than the amount of molten metal in the estimated shape $62_{n-1}$ of the (n−1)-th layer. FIG. 11B illustrates an error Δp between the planned deposition position and the deposition position set in accordance with the laminated shape in a case where the torch angle is not changed from a normal vertical downward direction. Meanwhile, FIG. 11C illustrates an error Δp between the planned deposition position and the deposition position set in accordance with the laminated shape in a case where the torch angle is changed to match the deposition direction. In this case, as apparent from the drawings, Δp in FIG. 11C is smaller than Δp in FIG. 11B.

Figure 11D:
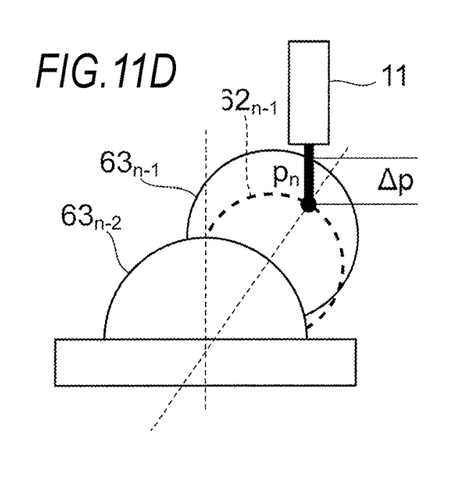
Figure 11E:
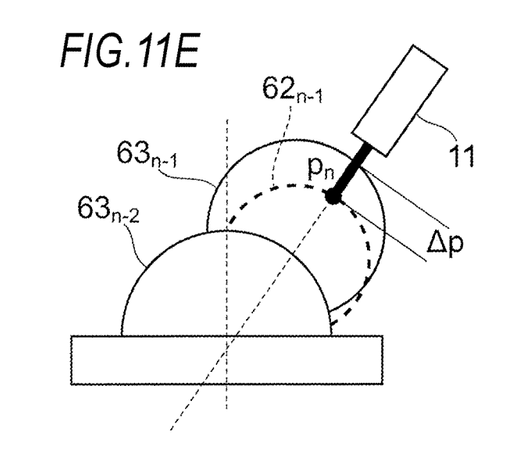

In addition, as illustrated in FIGS. 11D and 11E, the amount of molten metal in the laminated shape $63_{n-1}$ on the (n−1)-th layer is greater than the amount of molten metal in the estimated shape $62_{n-1}$ of the (n−1)-th layer. FIG. 11D illustrates an error Δp between the planned deposition position and the deposition position set in accordance with the laminated shape in a case where the torch angle is not changed from a normal vertical downward direction. Meanwhile, FIG. 11E illustrates an error Δp between the planned deposition position and the deposition position set in accordance with the laminated shape in a case where the torch angle is changed to match the deposition direction. In this case, as apparent from the drawings, Δp in FIG. 11E is also smaller than Δp in FIG. 11D. In this case, it is considered that there is the deposition position $p_n$ planned in the laminated shape $63_{n-1}$ when lamination is actually performed. At this time, since it is necessary to shrink the wire, when performing the lamination, the feeding of the wire may be controlled or the wire may be cut such that the protruding length of the wire becomes short beforehand.

Figure 12A:
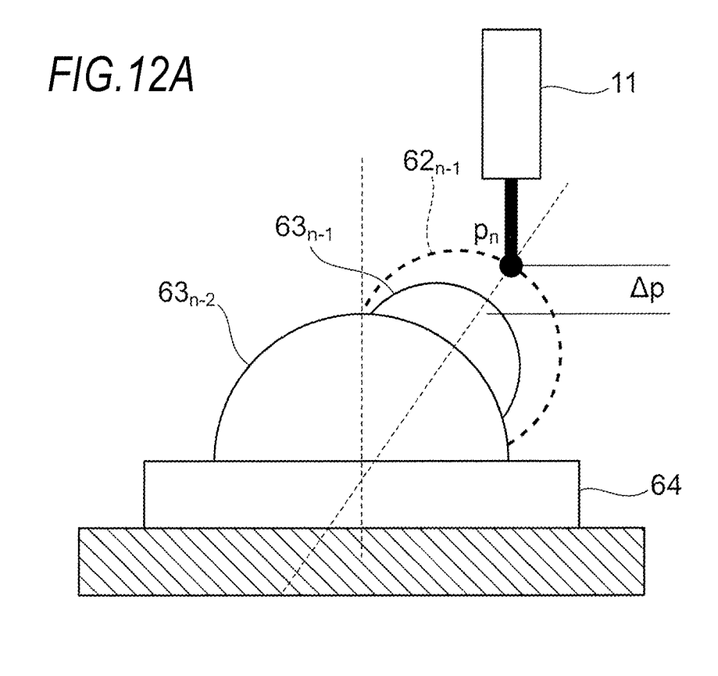
FIGS. 12A and 12B are explanatory views illustrating another example of the reduction of the error by setting the torch angle.
Figure 12B:
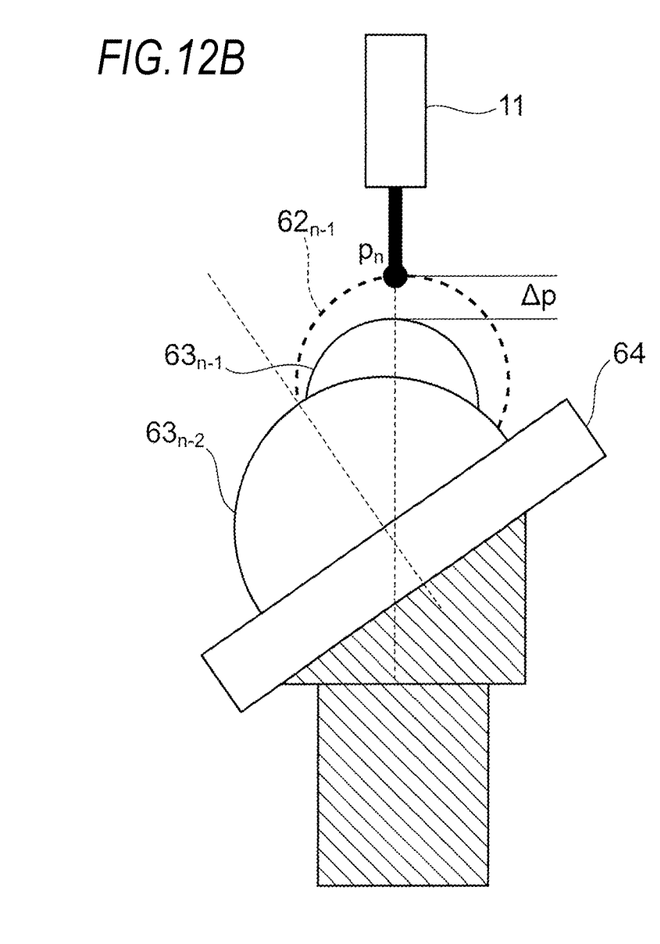

Furthermore, in FIGS. 11A to 11E, an aspect in which the posture of the welding torch 11 is controlled within an operating range of the welding robot 10 is illustrated, but there is also a case where the posture of the welding torch 11 should be controlled outside the operating range of the welding robot 10. FIGS. 12A and 12B are explanatory views illustrating the reduction of the error by setting the torch angle similar to FIG. 10. In the drawings, a solid line indicates a laminated shape and a broken line indicates an estimated shape.

As illustrated in the drawings, in a state where the laminated shape $63_{n-2}$ is formed on the (n−2)-th layer, the estimated shape $62_{n-1}$ is planned on the (n−1)-th layer, and the deposition position $p_n$ on the n-th layer is planned, it is assumed that the amount of molten metal in the laminated shape $63_{n-1}$ of the (n−1)-th layer is smaller than the amount of molten metal in the estimated shape $62_{n-1}$ of the n−1th layer. FIG. 12A illustrates an error Δp between the planned deposition position and the deposition position set in accordance with the laminated shape in a case where an angle relative to the workpiece of the welding torch 11 is not changed from a normal vertical downward direction. Meanwhile, FIG. 12A illustrates an error Δp between the planned deposition position and the deposition position set in accordance with the laminated shape in a case where the angle relative to the workpiece of the welding torch 11 is changed to match the lamination direction by tilting a base 64 which is an example of a support device with a tool or the like. In this case, as apparent from the drawings, Δp in FIG. 12B is also smaller than Δp in FIG. 12A.

Even in a case where the base 64 is tilted as illustrated in FIGS. 12A and 12B, the amount of molten metal in the laminated shape $63_{n-1}$ of the (n−1)-th layer becomes greater than the amount of molten metal in the estimated shape $62_{n-1}$ of the (n−1)-th layer, and as a result, it is considered that there is the deposition position $p_n$ planned in the laminated shape $63_{n-1}$ when the lamination is actually performed. At this time, since it is necessary to shrink the wire, when performing the lamination, the feeding of the wire may be controlled or the wire may be cut such that the protruding length of the wire becomes short beforehand.

(Details of Step 405)

In step 405, the control program output unit 45 outputs a control program including the welding conditions and the deposition position set by the lamination plan unit 43 and the deposition direction set by the deposition direction setting unit 44. Specifically, the control program for instructing the welding robot 10 on the position or posture of the welding torch 11 in accordance with the deposition position and deposition direction, and instructing the deposition amount (current value) or the travel speed in accordance with the welding conditions, is output to the recording medium 50. Otherwise, in a case illustrated in FIGS. 12A and 12B, the control program may instruct the posture of the base 64 in accordance with the deposition direction. In addition, the control program is read from the recording medium 50 to the control panel 20, and the welding robot 10 performs forming by laminating the molten metal in the control panel 20 as the control program operates.

Effects of Embodiment

As described above, in the present embodiment, the deposition direction of the molten metal is set such that the error between the deposition position planned in advance and the deposition position set in accordance with the state of the molten metal already laminated is reduced. Accordingly, even in a case where the error of the deposition position occurs, the wire can be expanded and contracted in the direction in which the error can be reduced at the time of lamination, and the error can be suppressed. In addition, it is possible to reduce the correction amount when correcting the deposition position already planned to the deposition position set in accordance with the state of the molten metal already laminated.

The present application is based on Japanese Patent Application (No. 2017-21093) filed on Feb. 8, 2017, and the content thereof is incorporated herein by reference.

DESCRIPTION OF REFERENCE NUMERALS AND SIGNS

1: metal lamination forming system
10: welding robot
11: welding torch
20: control panel
30: CAD device
40: track determination device
41: CAD data acquisition unit
42: CAD data division unit
43: lamination plan unit
44: deposition direction setting unit
45: control program output unit
50: recording medium

The invention claimed is:

1. A lamination control device comprising:
a processor configured
to acquire shape data that represents a shape of a three-dimensional formed object;
to generate control information which is information for controlling a lamination device that laminates a molten metal for forming the formed object by deposition, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the shape data, and a protruding length of a wire used for the deposition is reduced during movement from the first deposition position to the second deposition position; and
to output the control information.

2. The lamination control device according to claim 1, wherein
the specific deposition direction of the molten metal is a direction such that the error between the first deposition position and the second deposition position is minimized.

3. The lamination control device according to claim 1, wherein
each layer of the molten metal is approximated by a figure including a hemisphere, and
the specific deposition direction of the molten metal is a direction of a normal line that passes through the first deposition position of the hemisphere.

4. The lamination control device according to claim 1, wherein
the processor generates the control information which is information for further controlling a posture of the lamination device such that the error between the first deposition position and the second deposition position is reduced compared to a case where the deposition direction of the molten metal is oriented vertically downward so as to laminate the molten metals from the specific deposition direction of the molten metal.

5. The lamination control device according to claim 1, wherein
the processor generates the control information which is information for further controlling a posture of a support device that supports the formed object such that the error between the first deposition position and the second deposition position is reduced compared to a case where the deposition direction of the molten metal is oriented vertically downward so as to laminate the molten metals from the specific deposition direction of the molten metal.

6. A lamination control method comprising:
acquiring shape data that represents a shape of a three-dimensional formed object;
generating control information which is information for controlling a lamination device that laminates a molten metal for forming the formed object by deposition, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the acquired shape data, and a protruding length of a wire used for the deposition is reduced during movement from the first deposition position to the second deposition position; and outputting the generated control information.

7. A computer program product comprising a non-transitory computer readable storage medium having instructions encoded thereon that, when executed by a processor, cause the processor to execute process, the process comprising:

acquiring shape data that represents a shape of a three-dimensional formed object;

generating control information which is information for controlling a lamination device that laminates a molten metal for forming the formed object by deposition, and is information indicating at least a specific deposition direction of the molten metal such that an error between a first deposition position that is a deposition position of the molten metal set in advance and a second deposition position that is a deposition position of the molten metal set in accordance with an actual laminated state is reduced compared to a case where the deposition direction of the molten metal is oriented vertically downward, based on the acquired shape data, and a protruding length of a wire used for the deposition is reduced during movement from the first deposition position to the second deposition position; and outputting the generated control information.

\* \* \* \* \*